United States Patent
Kim

(10) Patent No.: US 12,278,670 B1
(45) Date of Patent: Apr. 15, 2025

(54) OVER THE AIR ADJACENT CHANNEL LEAKAGE RATIO (ACLR) MEASUREMENT

(71) Applicant: VIAVI SOLUTIONS INC., Chandler, AZ (US)

(72) Inventor: Jong-Min Kim, Seoul (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/492,814

(22) Filed: Oct. 24, 2023

(51) Int. Cl.
*H04B 17/354* (2015.01)
*H04L 27/26* (2006.01)

(52) U.S. Cl.
CPC ....... *H04B 17/354* (2015.01); *H04L 27/2602* (2013.01)

(58) Field of Classification Search
CPC ............. H04L 27/2602; H04L 27/2603; H04L 27/26025; H04L 27/2614; H04L 27/2623; H04L 27/2618; H04L 27/2621; H04L 27/26; H04L 27/2601; H04L 27/26035; H04L 27/2613; H04L 27/261; H04B 17/00; H04B 17/354; H04B 17/345; H04B 17/336; H04B 17/318; H04B 2215/00
See application file for complete search history.

(56) References Cited

U.S. PATENT DOCUMENTS

| | | | |
|---|---|---|---|
| 9,736,790 B1* | 8/2017 | Haub ................... | H04B 10/293 |
| 2005/0265499 A1* | 12/2005 | Zhang .................. | H04B 15/04 375/354 |
| 2010/0182903 A1* | 7/2010 | Palanki ................ | H04L 5/0007 370/252 |
| 2015/0171955 A1* | 6/2015 | Olesen .................. | H04B 17/21 370/252 |
| 2016/0150483 A1* | 5/2016 | Kim ..................... | H04W 52/243 455/127.2 |

OTHER PUBLICATIONS

3GPP TS 38.104. "NR; Base Station (BS) radio transmission and reception." 3rd Generation Partnership Project; Technical Specification Group Radio Access Network, Sep. 2021, 243 pages.
5G NR Downlink ACLR Measurement, 7 pages, downloaded from the Internet on Oct. 23, 2023. https://kr.mathworks.com/help/5g/ug/nr-downlink-ACLR-measurement.html.

* cited by examiner

*Primary Examiner* — Khanh C Tran
(74) *Attorney, Agent, or Firm* — Mannava & Kang, P.C.

(57) ABSTRACT

Methods and systems for adjacent channel leakage ratio (ACLR) measurement in a cellular network are provided by creating a measurement timing for a symbol or signal transmitted from a base station of the cellular network in an allocated frequency band, measuring power levels of the signal in the allocated frequency band based on the created measurement timing, and measuring power levels in adjacent bands based on the created measurement timing, and deriving the ACLR measurement from the measured power levels in the allocated frequency band and the measured power levels in the adjacent bands.

20 Claims, 9 Drawing Sheets

OVER THE AIR ADJACENT CHANNEL LEAKAGE RATIO (ACLR) MEASUREMENT

TECHNICAL FIELD

This patent application is directed to cellular network testing, and more specifically, to over the air measurement of cellular network performance metric adjacent channel leakage ratio (ACLR).

BACKGROUND

A cell site, also known as a cell tower or cellular base station, includes an antenna and electronic communications equipment to support cellular mobile device communication. The antenna and equipment are typically placed in connection with a radio mast or tower, and the equipment generally connects cell site air interfaces to wireline networks, which may be comprised of fiber optic cables and coaxial cables. At a cell site, there may be a variety of signals depending on technology, e.g., 4G Long Term Evolution (LTE), 5G New Radio (NR), Dynamic Spectrum Sharing (DSS), etc. Additionally, other signals such as Citizens Broadband Radio Service (CBRS) and similar communication signals may also be present and potentially interfere with the cellular network signals and measurement of cellular network performance metrics such as adjacent channel leakage ratio (ACLR).

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
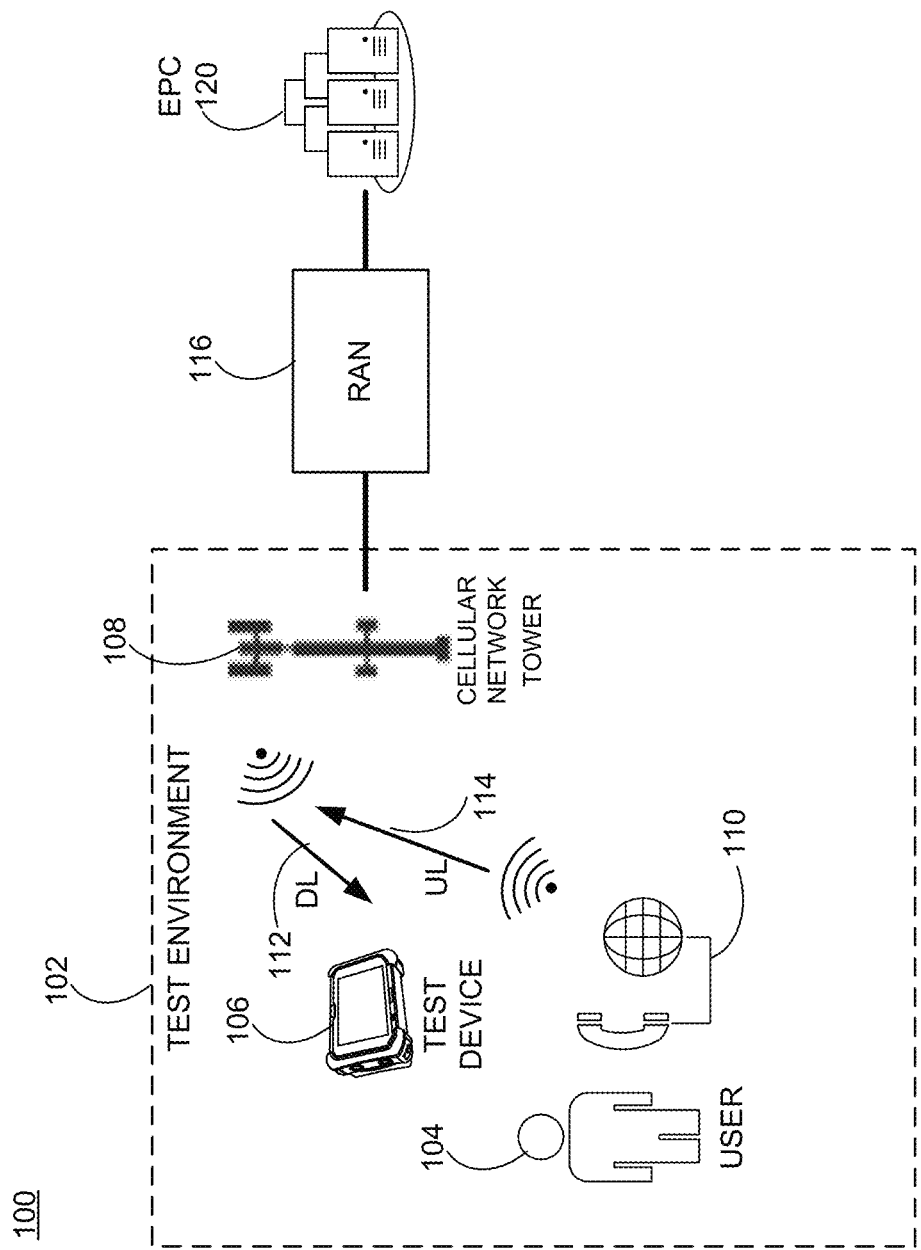
FIG. 1 illustrates a diagram of a test device in a cellular network test environment, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Adjacent channel leakage ratio (ACLR), a performance metric in cellular network communications, is the ratio of the filtered mean power centered on an assigned channel frequency to the filtered mean power centered on an adjacent channel frequency. Conventional ACLR measurements include connecting a measuring instrument directly to an output port of the communication equipment (e.g., base station transmitter) and measuring the leakage power in the frequency range corresponding to five times the active bandwidth for the equipment output. Wireless measurement of the leakage power may be performed in the same frequency range under the condition that there are no other signals in the radiating space other than the output to be measured. However, with the increased crowding of cellular frequency bandwidth, main signals from different service providers tend to be in adjacent or nearby bands making it difficult to make wireless ACLR measurements with only the to-be-measured signal being present in a given measurement band.

In some examples of the present disclosure, ACLR measurement may be performed by synchronizing the signal of the measurement object in the measurement band (five times the target signal bandwidth) and adjusting the time for the measurement pattern in a time division duplex (TDD) system (for example, 5G NR TDD). When two signals from different providers (the same 5G NR TDD service provided by another service provider) are present in a band other than the measurement target band (in vicinity of the target signal), the noise of the band may be measured and displayed using the Guard Period (GP) section. The output of the target band and characteristics of noise may also be evaluated in other bands. In bands other than the measurement target band, measurements may be made according to the measured time (output time) of the target signal and the noise portion may be extracted from the measured data. The noise may be measured in frequency bands other than the output target band through multiple measurements and the leakage output may be evaluated according to the target signal output.

Some advantages and benefits of the systems and methods described herein are readily apparent. For example, ACLR measurement may be performed for maintenance after installation without having to disconnect equipment (disrupting service) or having a technician bet at the base station site to make a wired connection, thereby reducing costs and complexity of maintenance and avoiding costly service interruptions. Other benefits and advantages may also be apparent.

FIG. 1 illustrates a diagram 100 of a test device 106 in a test environment 102, according to an example. As shown in the diagram 100, a user 104 may use user equipment (UE) 110 to communicate with other devices over the cellular network. Communication may include an uplink 114 to a cellular network tower 108 and a downlink 112 from the cellular network tower 108. A test device 106 to test and analyze signals from components at the cellular network tower 108 (e.g., a base station), as well as other signals which may come from other signal sources such as a radio tower, telecom signals, and others may be placed in close proximity with the user equipment (UE) 110. Thus, the test device 106 may measure a maximum EMF range assigned to the downlink 112 passed to user equipment (UE) 110 from the cellular network tower 108. The cellular network tower 108 may be part of a cell site and connected to backhaul via a radio access network (RAN) 116 and the backhaul may connect to Evolved Packet Core (EPC) 120.

A connection between the cellular network tower 108 and the rest of the world may be referred to as a backhaul link or simply backhaul. A backhaul may include wired, fiber optic and wireless components, such as microwave transmission equipment. In conventional 3G and 4G architectures, fronthaul is associated with a RAN 116 architecture including centralized base band units (BBUs), i.e., baseband controllers, and standalone remote radio heads (RRHs) installed at remote cell sites. These BBU and RRH functional blocks, as well as the equipment that performs these functions, are located further away from each other than in prior mobile backhaul models. In some instances, the RRH and BBU are at the same location. In other instances, the RRH is located at the cell site, whereas the BBU is located in a centralized and protected location where it serves multiple RRHs. The optical links that interconnect the BBU and the multiple RRHs are referred to as fronthaul. The fronthaul includes interfaces between the RRH and the BBU. The backhaul includes interfaces between the BBU and the EPC 120.

In an example, the test environment 102 may include the cell site, which includes the cellular network tower 108 or cellular base station having antennas and electronic communications equipment to support cellular mobile device communication. The antennas and equipment are typically placed in connection with a radio mast or tower, and the equipment generally connects cell site air interfaces to wireline networks, which may include fiber optic cables and coaxial cables. Typically, the cell site may be connected to backhaul via the RAN 116 and the backhaul may connect to the EPC 120.

The RAN is the part of a mobile network that connects end-user devices, like smartphones, to the cloud. This is achieved by sending information via radio waves from end-user devices to a RAN's transceivers, and finally from the transceivers to the core network which connects to the global internet. Diagram 100 shows the test device 106 performing signal analysis. In an example, the user 104, such as a cellular service provider technician, may use the test device 106 to perform signal analysis for discovered carrier frequency and technology as well as discovered channels of selected technologies. Furthermore, interference hunting and beam centric electromagnetic field (EMF) testing on a selected carrier may be performed with the test device 106. In an example use case, the testing may be performed when the cell site is being installed, such as to ensure proper operation of the cell site with user devices, such as smartphones or other end user cellular devices. In another example use case, after installation, customers of the cellular service provider may be having technical issues, and the user 104 may use the test device 106 to check for performance metrics such as ACLR post-installation.

As discussed herein, post-installation ACLR measurement may be cumbersome as wired measurements require disconnection of base station equipment (especially in cases where integrated antennas are used), disruption of service, etc. ACLR measurement according to examples by synchronizing the signal of the measurement object in the measurement band (five times the target signal bandwidth) and adjusting the time for the measurement pattern in a time division duplex (TDD) system (for example, 5G NR TDD) may allow over-the-air measurement of this important performance metric without service disruption or even site visit by a technician.

It should be appreciated that a test device to perform over the air ACLR measurements may be a spectrum analyzer and implemented with any number components, where certain functionality may be distributed among various components and sub-systems or performed by additional components or sub-systems. Furthermore, the test device may be any RF test device including, but not limited to, a spectrum analyzer, a cellular system monitoring device, an RF power analyzer, etc.

Figure 2:
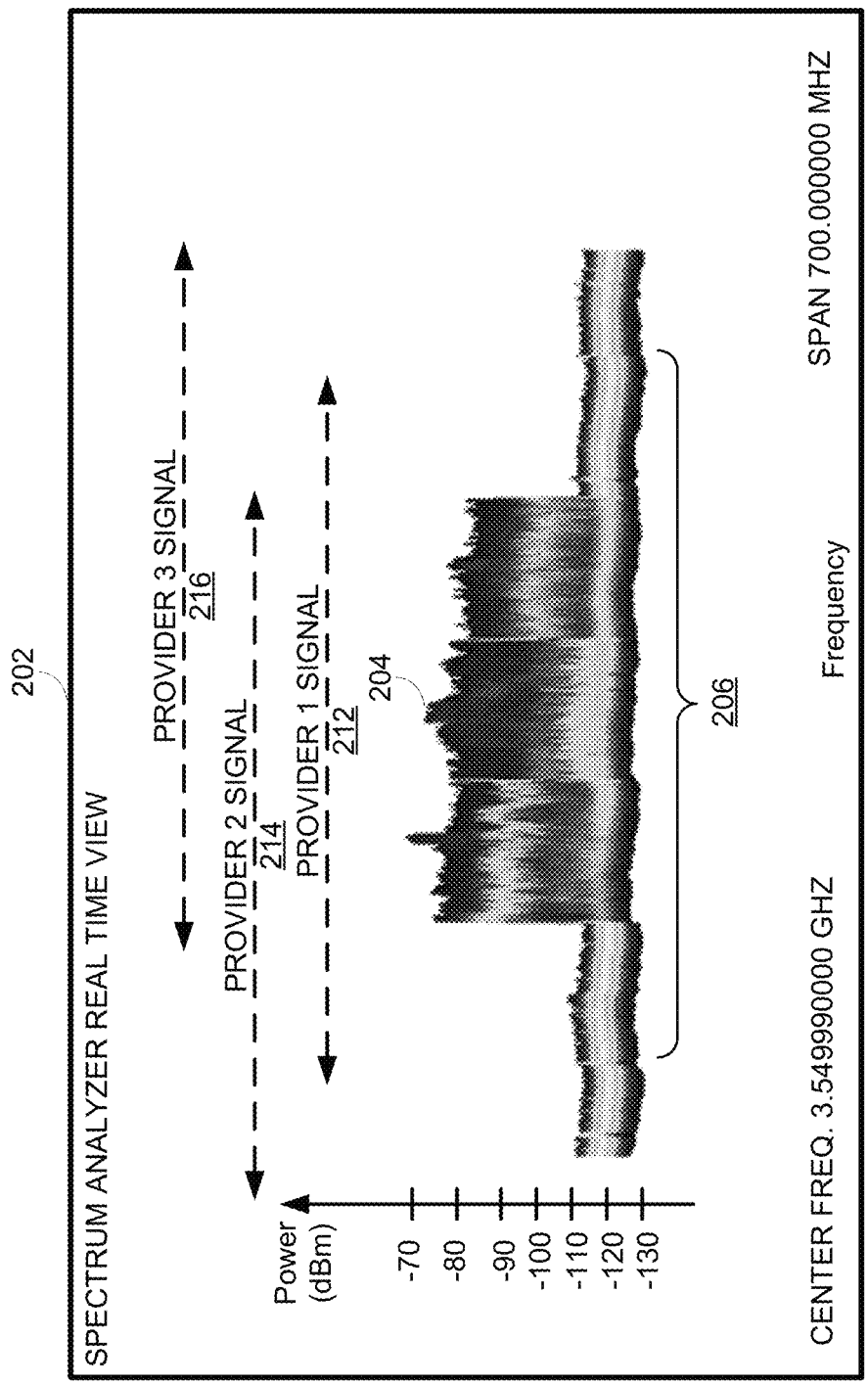
FIG. 2 illustrates a spectrum analyzer real time measurement screenshot showing how different service provider signals may interfere with ACLR measurement of a selected carrier signal, according to an example.

FIG. 2 illustrates a spectrum analyzer real time measurement screenshot showing how different service provider signals may interfere with ACLR measurement of a selected carrier signal, according to an example.

The screenshot in FIG. 2 shows a real time cellular (5G NR) signal 204 from a first service provider 212 at a center frequency of 3.459 GHz. For ACLR measurement (per common standards), five times the band of the main signal, band 206 is measured. The screenshot also shows two additional signals from a second service provider 214 and a third service provider 216 adjacent to the signal 212. Thus, the conditions (clear 5× band) for the ACLR measurement are not met in this practical scenario.

Wireless leakage power for ACLR evaluation according to common standards (e.g., TS 38.104 Section 6.6.3) is measured in a frequency range that is five times (5×) the active bandwidth under the condition that there are no other signals in the radiating space other than the signal to be measured. When measuring over the air of installed equipment, the 5× band may include another service band (another service provider's signal). Thus, ACLR measurement may not be possible if there are adjacent signals in the service frequency band and it is not possible to secure five times the bandwidth where only the to be measured signal for the ACLR measurement exists.

ACLR measurement of RF output equipment (e.g., base station equipment) may need to be measured regularly to determine the influence of the installed base station output on other bands. The effect on the output can be evaluated when there are no signals in the surrounding bands other than the own output. However, recently, in the case of base stations for 5G NR in the 3.5 GHZ band, they are manufactured with an integrated antenna, so the installation location may not be easily accessible to management personnel, and measuring ACLR using conventional techniques may be impractical. Additionally, communication services must be stopped during the measurement time, which may increase customer inconvenience.

Figure 3:
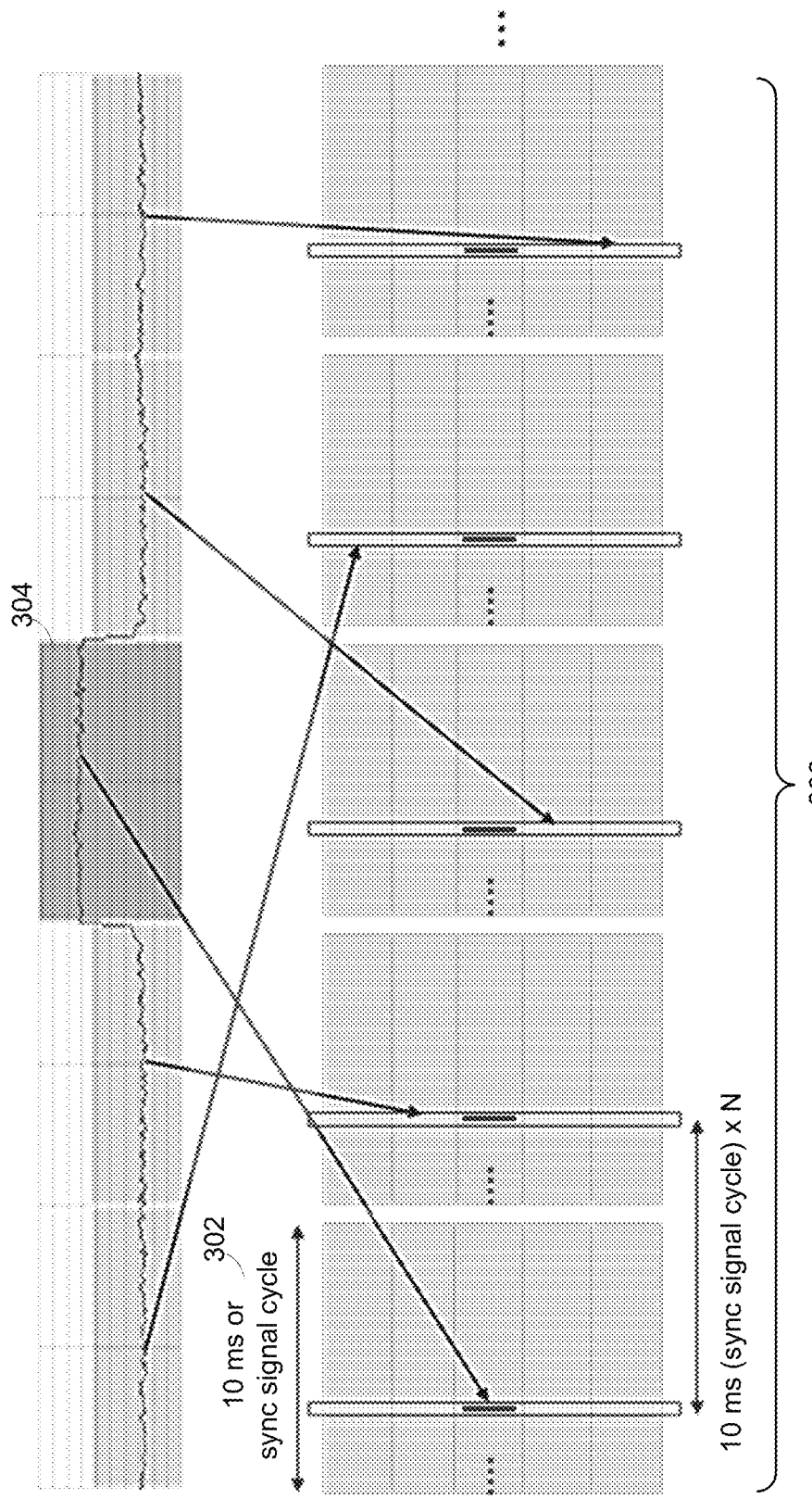
FIG. 3 illustrates measurement timing creation as part of over the air ACLR measurement, according to an example.

FIG. 3 illustrates measurement timing creation as part of over the air ACLR measurement, according to an example. An approach to measure ACLR while a base station is in operation according to some examples includes using the TDD service characteristics of 5G NR. The base station to be measured may periodically transmit the output for measuring ACLR (base station orthogonal channel noise simulator "OCNS") to a specific symbol in time. The relevant output may be measured at a specific time, and noise signals may be measured in bands other than the output according to the periodicity of the measurement time. If a different service occupies an adjacent band, only the noise portion in the corresponding frequency band may be extracted from the output, and only the noise portion for the measurement band may be reconstructed through repeated measurements. For comparison, the noise in the guard period (GP) section of TDD may be measured and compared with the reconstructed noise to confirm performance. The service output of other (adjacent) bands may have some signal-free sections depending on the 5G NR service method, which may be identified and the impact on the output measured in the signal-free section may be measured.

5G NR signals are based on the 10 ms frame defined in the LTE cellular technology. Synchronization signals such as SSB are variable at 5 m/10 m/20 m/40 m/80 m/160 m, but the minimum unit of these signals is also based on the 10 ms frame. In creating measurement timing, a frame of 10 ms is configured based on SSB synchronization and a 10 ms timer created for the measurement. The created timer contains offset information for the time measured at 10 ms. The measurement signals of the remaining bands may then be measured based on the created timer. These conditions assume that the ACLR measurement signal includes a signal with repeatability based on a 10 ms frame.

As shown in FIG. 3, for the measurement timing creation, the OCNS may be used, in which repeatability is guaranteed based on a 10 ms basic frame 302 or a frame 304 containing a synchronization signal. Other bands 306 may be measured using timing created based on the basic frame 302 (or synchronization signal containing frame 304). A measurement interval (N) may be determined depending on system performance. However, the measurement time is determined in 10 ms (synchronization signal cycle) units. When measuring ACLR, the base station generates and transmits signals for the entire band to measure ACLR. The signal transmission is repeated at least 10 ms each time. The measurement is performed based on the 10 ms period, and the required band is measured by shifting the frequency.

Measurements in five zones shown in FIG. 3 represent five frequency changes. At 10 ms, processing time is required to display the symbol corresponding to ACLR as a spectrum. Accordingly, in order to draw one spectrum, 10 ms of physical review time (extraction of measurement signal) and display time are required. Thus, the 10 ms signal cannot be processed immediately after the 10 ms signal, and the processing time is 10 ms×N in 10 ms increments. The test device thus processes the next 10 ms. This processing time is dependent on the performance of the processing unit of the test device and may be increased by multiples of 10 ms to account for the 10 ms intervals.

Figure 4A:
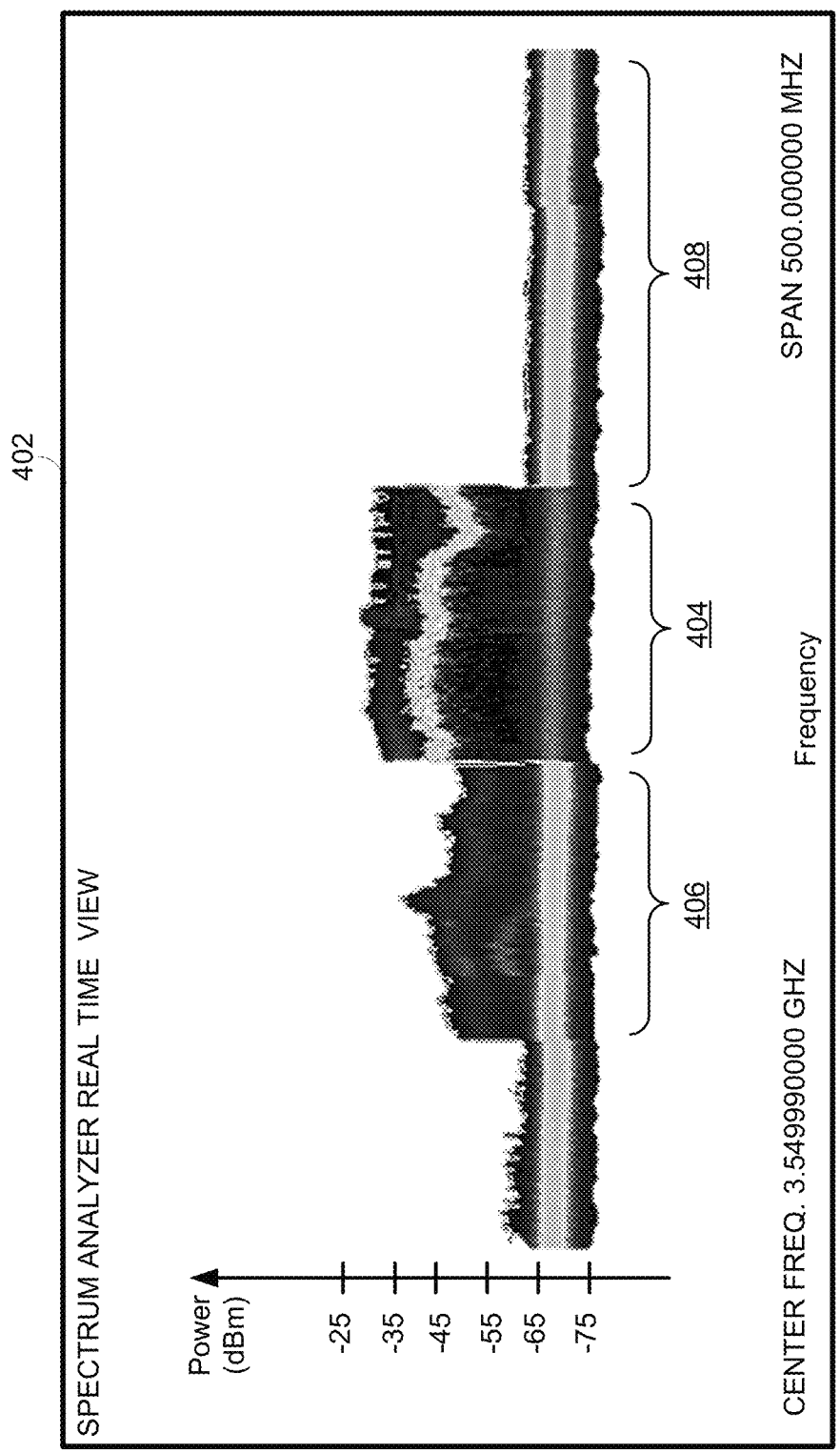
FIG. 4A illustrates a real time view of a signal to be measured along with a second provider signal in adjacent band, according to an example.

FIG. 4A illustrates a real time view of a signal to be measured along with a second provider signal in adjacent band, according to an example. Spectrum analyzer screenshot 402 shows signals captured in ACLR bands across frequency and power axes similar to the screenshot in FIG. 2. The signal to be measured 404 is in the central band, and a second provider signal 406 (from a different service provider) is occupying the band adjacent to the signal to be measured. Other adjacent bands 408 only contain noise.

Figure 4B:
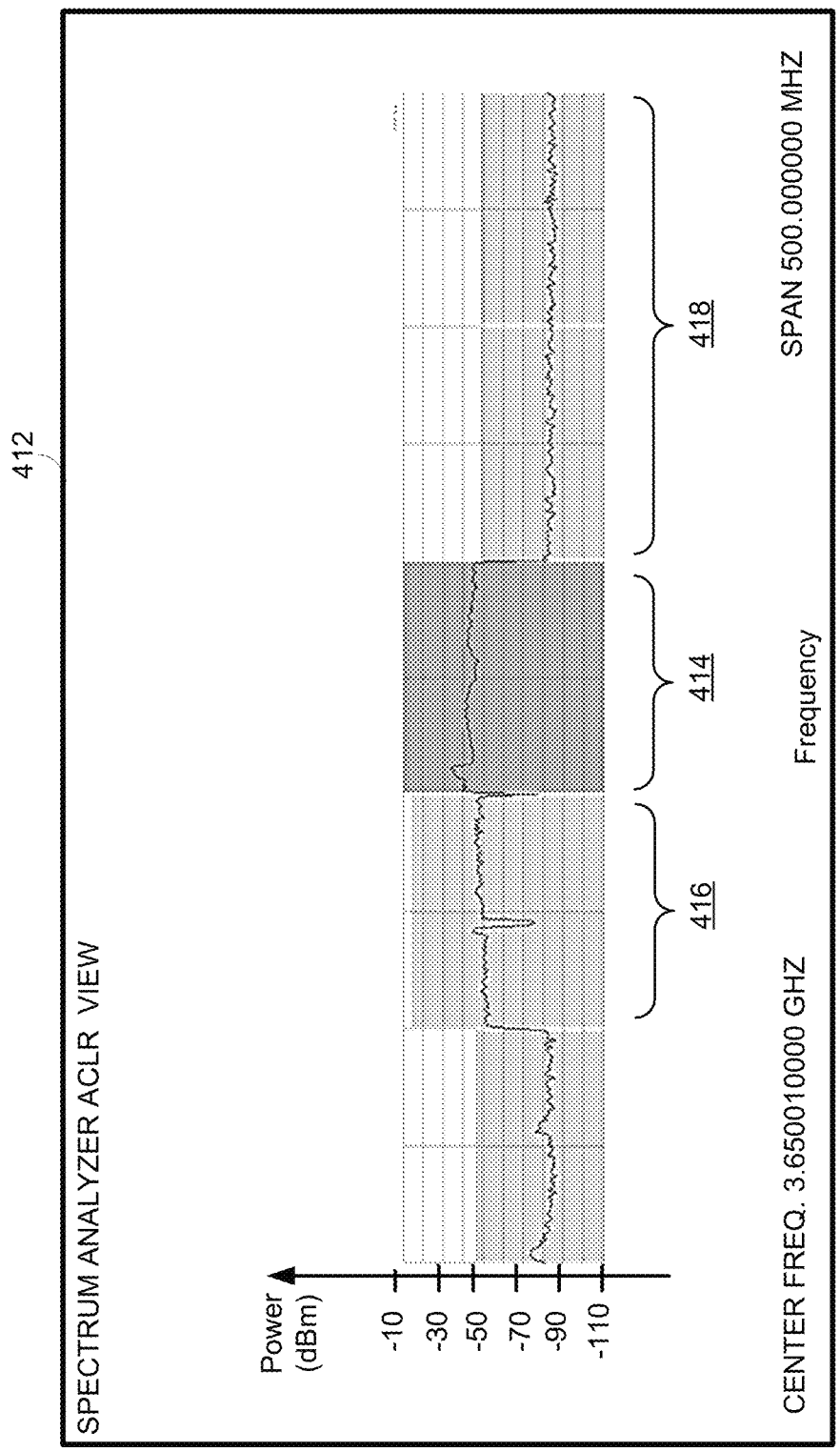
FIG. 4B illustrates ACLR measurement of the signal in FIG. 4A using conventional approach, according to an example.

FIG. 4B illustrates ACLR measurement of the signal in FIG. 4A using conventional approach, according to an example. ACLR measurement screenshot 412 of a spectrum analyzer in FIG. 4B shows capture of the signal to be measured 414 in the central band along with low noise signals in some adjacent bands 418. However, conventional over the air measurement approaches may also capture the second provider signal 416 (from a different service provider) occupying the band adjacent to the signal to be measured 414. Thus, the ACLR measurement for the signal to be measured 414 may not be accurate.

Figure 4C:
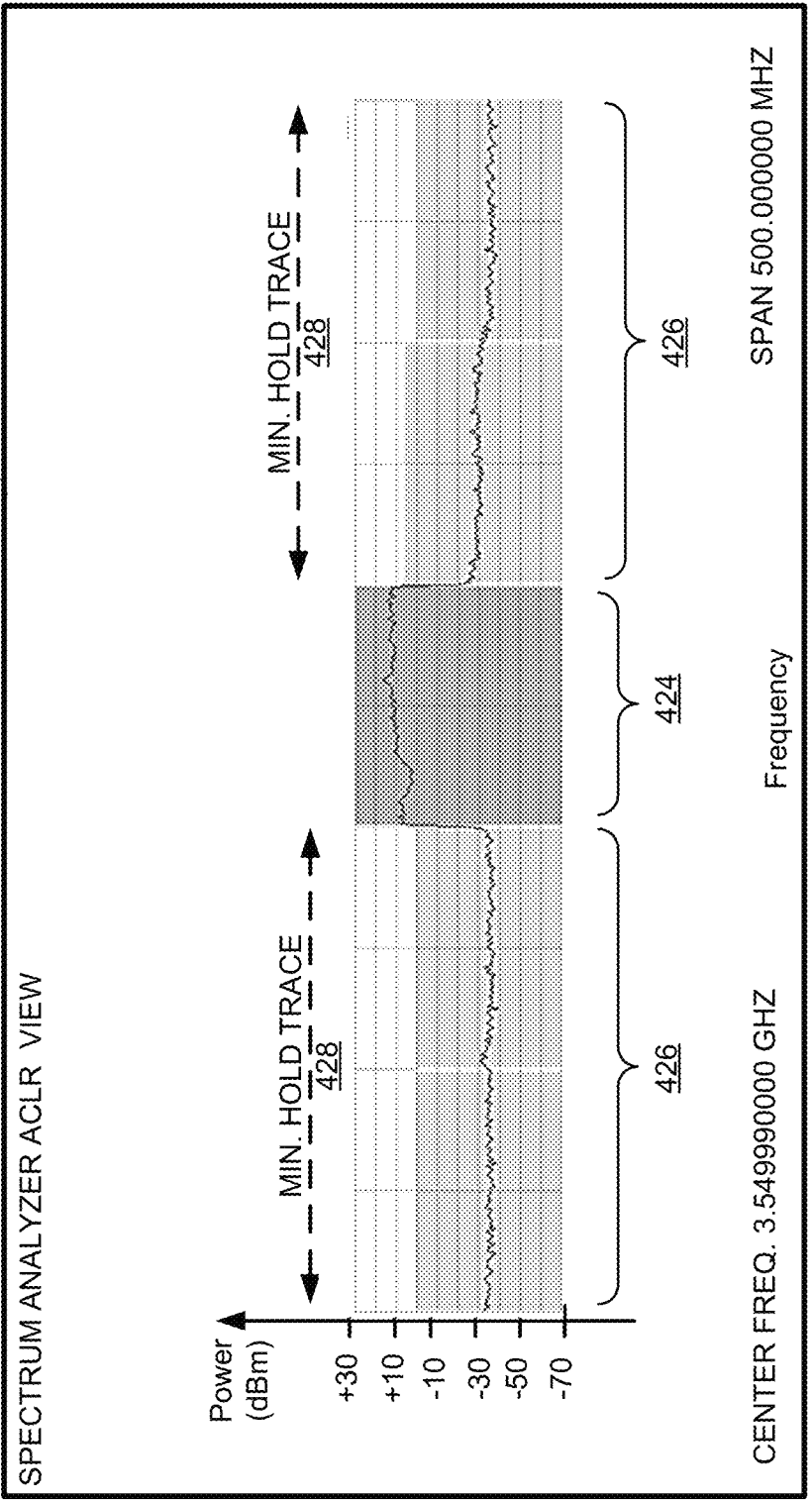
FIG. 4C illustrates ACLR measurement of the signal in FIG. 4A using minimum hold approach, according to an example.

FIG. 4C illustrates ACLR measurement of the signal in FIG. 4A using minimum hold approach, according to an example. Spectrum analyzer screenshot 422 shows signals captured in ACLR bands across frequency and power axes. By using minimum hold trace 428 in the bands adjacent to the signal to be measured 424, any other provider signals are ignored and the noise in the adjacent bands 426 is captured. Thus, over the air ACLR measurement conditions are met even if a second provider signal exists next to the signal to be measured.

Figure 5:
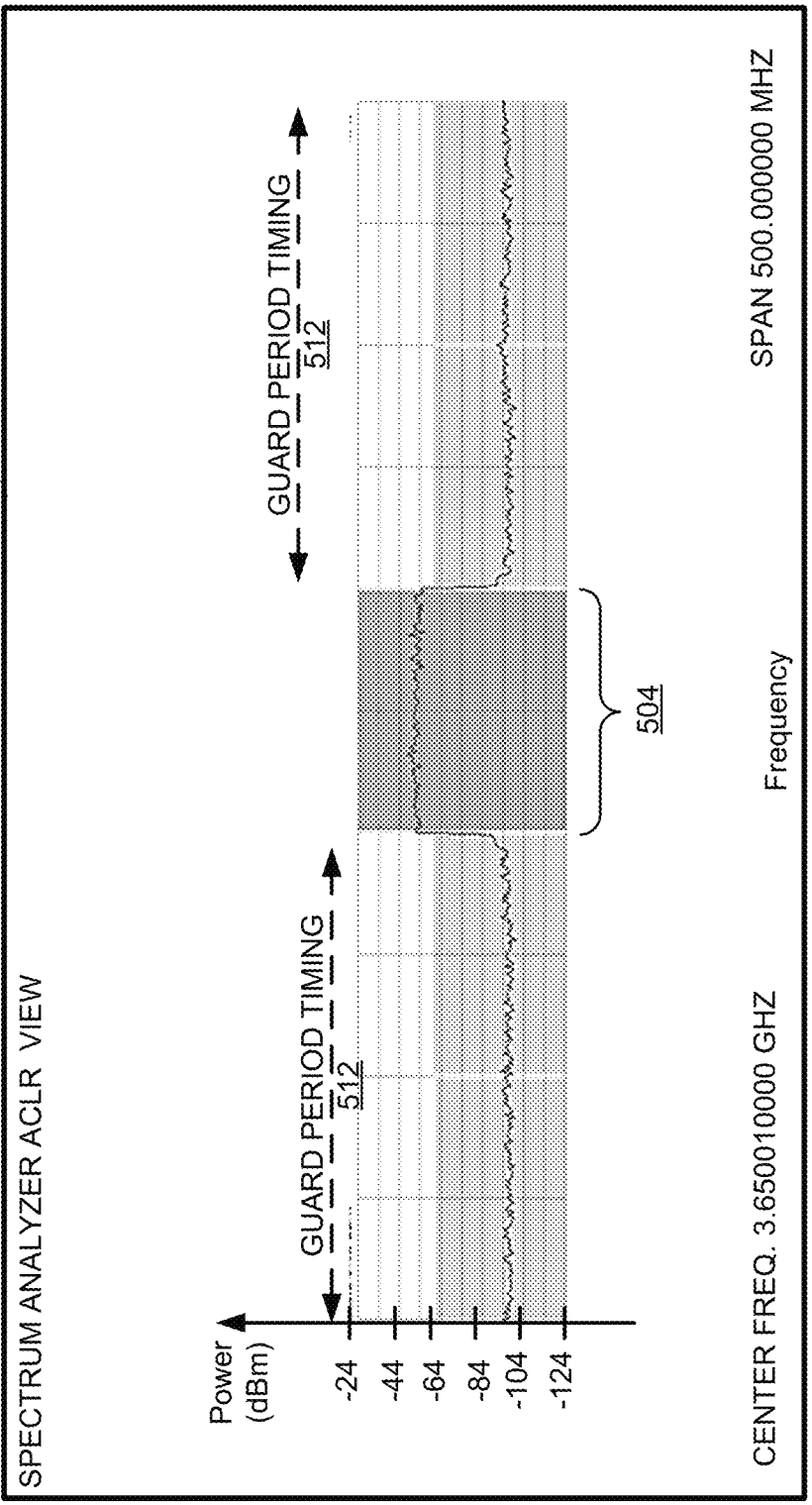
FIG. 5 illustrates a spectrum analyzer ACLR measurement screenshot showing time division duplex (TDD) configuration timing noise level check, according to an example.

FIG. 5 illustrates a spectrum analyzer ACLR measurement screenshot showing time division duplex (TDD) configuration timing noise level check, according to an example.

Spectrum analyzer screenshot 502 shows signals captured during TDD configuration timing noise level check. As mentioned herein, time division duplex (TDD) refers to duplex communication links where uplink is separated from downlink by the allocation of different time slots in the same frequency band allowing asymmetric flow for uplink and downlink data transmission. The noise in the guard period (GP) timing sections 512 of TDD may be measured and compared with the reconstructed noise to confirm performance. The service output of other (adjacent) bands may have some signal-free sections depending on the 5G NR service method, which may be identified and the impact on the output measured in the signal-free section may be measured. Screenshot 502 also shows actual signal 504 in the center band.

Figure 6:
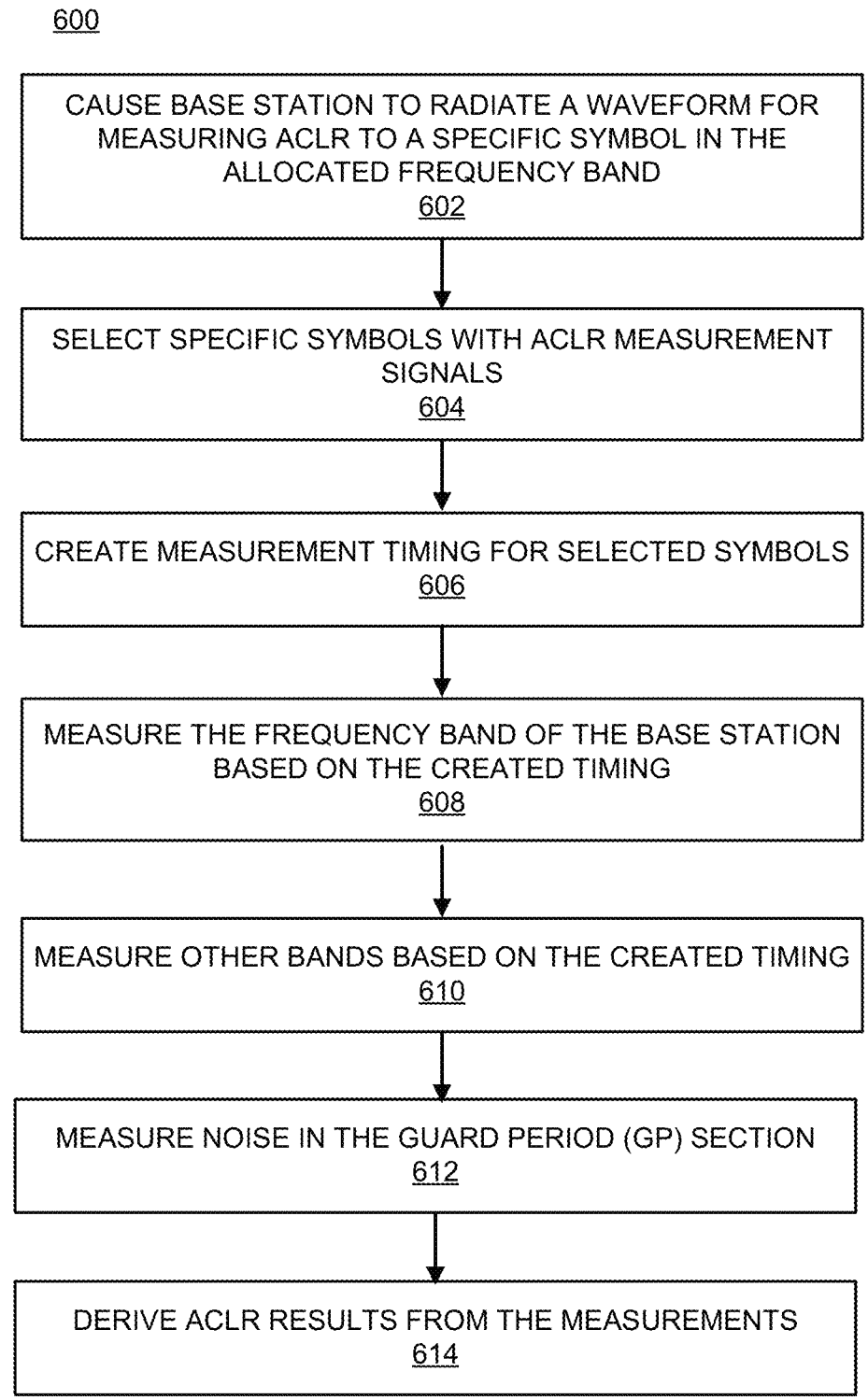
FIG. 6 illustrates a flow chart of a method for ACLR measurement of network base stations, according to an example.

FIG. 6 illustrates a flow chart of a method for ACLR measurement of network base stations, according to an example. The method 600 is provided by way of example, as there may be a variety of ways to carry out the method described herein. Although the method 600 is primarily described as being performed by the test device 106 of FIG. 1, the method 600 may be executed or otherwise performed by one or more processing components of another system or a combination of systems. Each block shown in FIG. 6 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 602, the test device 106 may focus on a signal from a base station transmitter. In some examples, the test device 106 may request the base station to transmit a specific symbol in the allocated frequency band or make the measurement(s) while a specific symbol is being transmitted by the base station.

At block 604, the test device 106 may create a measurement timing for selected symbols (among available symbols), which may be selected with ACLR measurement signals at block 606. The measurement interval may be selected as multiples of a 10 ms basic frame containing the transmitted signal or a frame containing a synchronization signal.

At block 608, the frequency band of the base station may be measured based on the created timing. Other (adjacent) bands to the main signal) may be measured also based on the created timing at block 610. For comparison, the noise in the guard period (GP) section of TDD may be measured and compared with the reconstructed noise to confirm performance at block 612. Subsequently, ACLR results may be derived from the measurements by the test device 106.

Figure 7:
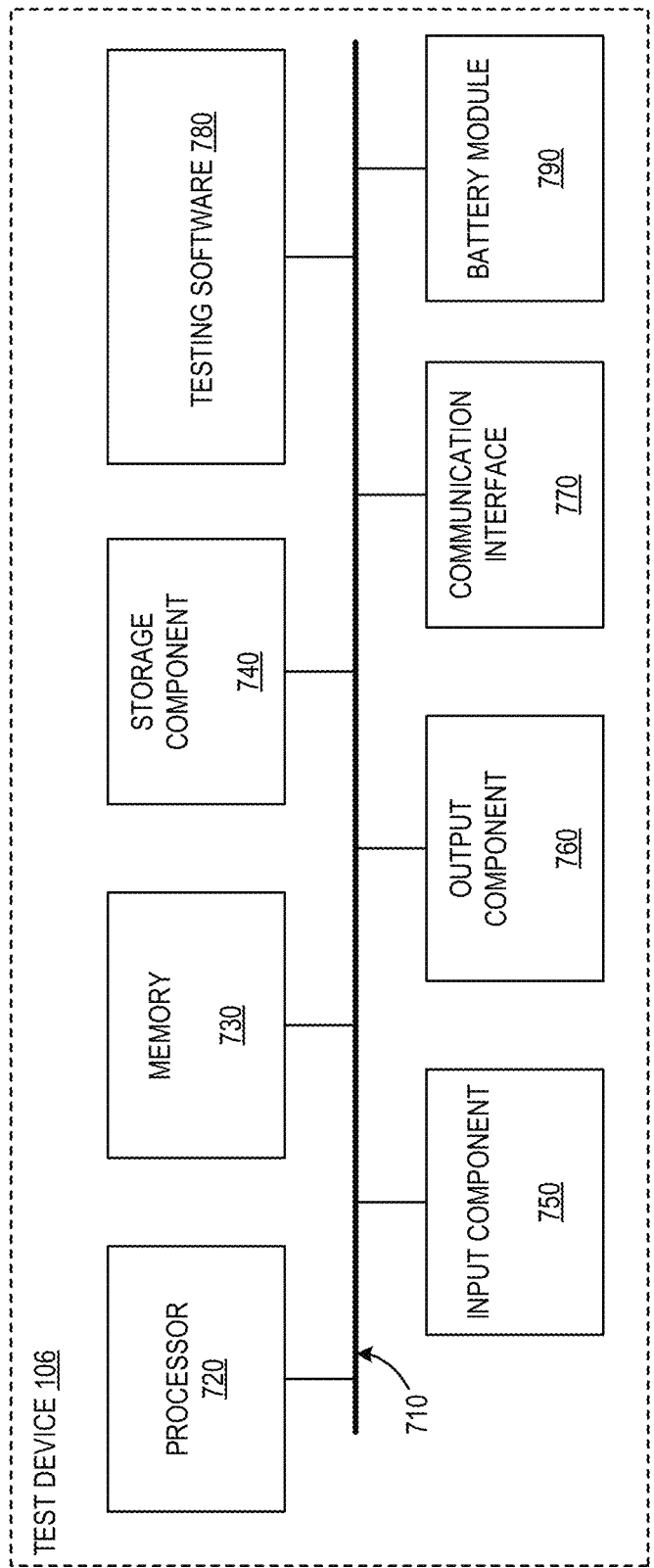
FIG. 7 illustrates a block diagram of the test device, according to an example.

FIG. 7 illustrates a block diagram of the test device 106, according to an example. As shown in block diagram, the test device 106 may include the components shown in FIG. 7. The test device 106 may include a bus 710, a processor 720, a memory 730, a storage component 740, an input component 750, an output component 760, a communication interface 770, and battery module 790.

Bus 710 includes a component that permits communication among the components of test device 106. Processor 720 may be implemented in hardware, firmware, or a combination of hardware and software. Processor 720 may include one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 720 may include one or more processors capable of being programmed to perform a function. Memory 730 may include one or more memories such as a random access memory (RAM), a read only memory (ROM), and/or another type of dynamic or static storage device (e.g., a flash memory, a magnetic memory, and/or an optical memory) that store information and/or instructions for use by processor 720.

Storage component 740 stores information and/or software related to the operation and use of test device 106. For example, storage component 740 may include a hard disk (e.g., a magnetic disk, solid state disk, etc.) and/or another type of non-transitory computer-readable medium. Test device 106 may also include testing software 780 executed by the processor 720 to perform various functional tests.

The input component 750 may include a component that permits the test device 106 to receive information, such as via user input (e.g., a touch screen display, a keyboard, a keypad, a mouse, a button, a switch, and/or a microphone). Additionally, or alternatively, input component 750 may include a sensor for sensing information (e.g., a GPS component, an accelerometer, a gyroscope, and/or an actuator). Output component 760 includes a component that provides output information from the test device 106 (e.g., a display, a speaker, a user interface, and/or one or more light-emitting diodes (LEDs)). Output component 760 may include a display providing a GUI. Input component 750 and output component 760 may be combined into a single component, such as a touch responsive display, also known as an interactive display or a touchscreen.

Communication interface 770 may include a transceiver-like component (e.g., a transceiver and/or a separate receiver and transmitter) that enables test device 106 to communicate with other devices, such as via a wired connection, a wireless connection, or a combination of wired and wireless connections. Communication interface 770 may permit the test device 106 to receive information from another device and/or provide information to another device. For example, communication interface 770 may include an Ethernet interface, an optical interface, a coaxial interface, an infrared interface, an RF interface, a universal serial bus (USB) interface, a Wi-Fi interface, a cellular network interface, or the like.

Battery module 790 is connected along bus 710 to supply power to processor 720, memory 730, and internal components of the test device 106. Battery module 790 may supply power during field measurements by the test device 106. Battery module 790 may permit the test device 106 to be a portable device.

The test device 106 may perform one or more processes described herein. The test device 106 may perform these processes by processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may instruct processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The test device 106 may include components other than shown. For example, the test device 106 may include a spectrum analyzer and power meter for performing measurements described above. The number and arrangement of components shown in FIG. 7 are provided as an example. In practice, the test device 106 may include additional components, fewer components, different components, or differently arranged components than those shown in FIG. 7. Additionally, or alternatively, a set of components (e.g., one or more components) of the test device 106 may perform one or more functions described as being performed by another set of components of the test device 106.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the apparatuses, systems, and methods described herein may minimize and/or reduce ACLR measurement errors and inaccuracies, and thereby facilitate more reliable and accurate measurements, specifically without service interruption. It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method to perform adjacent channel leakage ratio (ACLR) measurements in a cellular network, the method comprising:
    receiving transmission of a symbol from a base station in an allocated frequency band;
    creating a measurement timing for the transmitted symbol;
    measuring transmitted power levels in the allocated frequency band based on the created measurement timing;
    measuring power levels in adjacent bands based on the created measurement timing; and
    deriving ACLR from the measured transmitted power levels in the allocated frequency band and the measured power levels in the adjacent bands.

2. The method of claim 1, further comprising:
    selecting the transmitted symbol from a plurality of available symbols.

3. The method of claim 1, further comprising:
    measuring noise levels in a plurality of guard periods (GPs) to confirm performance.

4. The method of claim 3, wherein measuring the power levels in the adjacent bands based on the created measurement timing comprises:
    measuring a minimum value of noise in the adjacent bands.

5. The method of claim 1, wherein the adjacent bands comprise four frequency bands of same width as the allocated frequency band.

6. The method of claim 1, wherein deriving the ACLR comprises:
    performing the measurements a plurality of times.

7. The method of claim 1, wherein creating the measurement timing for the transmitted symbol comprises:
    employing base station orthogonal channel noise simulator (OCNS), wherein the symbol is periodically transmitted.

8. The method of claim 7, wherein the measurement timing is based on a 10 ms basic frame or a frame containing a synchronization signal.

9. The method of claim 8, wherein a measurement interval is N times the 10 ms basic frame or the frame containing a synchronization signal, N being determined based on a system performance.

10. A test device to perform adjacent channel leakage ratio (ACLR) measurements in a cellular network, the test device comprising:
    an input component to receive and process cellular communication signals associated with an established communication from a base station;
    an interactive display to present the ACLR measurements and to receive configuration input from a user; and
    a processor coupled to the input component and the interactive display, the processor to:
        select a symbol from a plurality of available symbols;
        receive transmission of the symbol from the base station in an allocated frequency band;
        create a measurement timing for the transmitted symbol;
        measure transmitted power levels in the allocated frequency band based on the created measurement timing;
        measure power levels in adjacent bands based on the created measurement timing; and
        derive ACLR from the measured transmitted power levels in the allocated frequency band and the measured power levels in the adjacent bands.

11. The test device of claim 10, wherein the processor is further to:
    employ base station orthogonal channel noise simulator (OCNS) to create the measurement timing, wherein the symbol is periodically transmitted.

12. The test device of claim 11, wherein the measurement timing is based on a 10 ms basic frame or a frame containing a synchronization signal.

13. The test device of claim 12, wherein a measurement interval is N times the 10 ms basic frame or the frame containing a synchronization signal, N being determined based on a system performance.

14. The test device of claim 10, wherein the processor is further to:
    measure noise levels in a plurality of guard periods (GPs) to confirm performance.

15. The test device of claim 10, wherein the processor is further to:
    measure a minimum value of noise in the adjacent bands.

16. The test device of claim 10, wherein the adjacent bands comprise two sets of frequency bands of same width as the allocated frequency band on either side of the allocated frequency band.

17. A non-transitory computer-readable storage medium storing executable instructions that when executed instruct a processor of a test device to perform adjacent channel leakage ratio (ACLR) measurements in a cellular network, including instructing the processor to:
    select a symbol from a plurality of available symbols;
    receive transmission of the symbol from a base station in an allocated frequency band;
    create a measurement timing for the transmitted symbol by employing base station orthogonal channel noise simulator (OCNS), wherein the symbol is periodically transmitted;
    measure transmitted power levels in the allocated frequency band based on the created measurement timing;
    measure power levels in adjacent bands based on the created measurement timing; and derive ACLR from the measured transmitted power levels in the allocated frequency band and the measured power levels in the adjacent bands.

18. The non-transitory computer-readable storage medium of claim 17, wherein the executable instructions further instruct the processor to:
perform the measurements a plurality of times to derive the ACLR.

19. The non-transitory computer-readable storage medium of claim 17, wherein
the measurement timing is based on a 10 ms basic frame or a frame containing a synchronization signal, and
a measurement interval is N times the 10 ms basic frame or the frame containing a synchronization signal, N being determined based on a system performance.

20. The non-transitory computer-readable storage medium of claim 17, wherein the executable instructions further instruct the processor to:
measure noise levels in a plurality of guard periods (GPs) to confirm performance.

\* \* \* \* \*